Dec. 19, 1967    C. D. OSBORNE    3,358,671
SPACE HEATER AND COOKER
Filed Oct. 21, 1965    2 Sheets-Sheet 1

INVENTOR.
CHARLES D. OSBORNE
BY Kimmel, Crowell & Weaver
ATTORNEYS.

Dec. 19, 1967 C. D. OSBORNE 3,358,671
SPACE HEATER AND COOKER
Filed Oct. 21, 1965 2 Sheets-Sheet 2

INVENTOR.
CHARLES D. OSBORNE
BY Kimmel, Crowell & Weaver
ATTORNEYS.

United States Patent Office 3,358,671
Patented Dec. 19, 1967

3,358,671
SPACE HEATER AND COOKER
Charles D. Osborne, Bryte, Calif. (P.O. Box 46, Guinda, Calif. 95637)
Filed Oct. 21, 1965, Ser. No. 499,507
14 Claims. (Cl. 126—110)

ABSTRACT OF THE DISCLOSURE

A stove including a substantially hollow supporting frame, the frame having a broiler and an oven mounted therein, the oven being disposed in vertically spaced superimposed relation relative to said broiler and arranged to define a heated air passageway therebetween, the oven and the frame cooperating to define a heated air conduit therebetween having an end communicating with the passageway, the other end of the conduit opening into the atmosphere via a heated air outlet formed in the frame, and hot air blower means supported on the frame and communicating with the outlet to forcibly draw heated air from the conduit and consequently from the passageway.

---

This invention relates to a space heater, and more particularly to a device which utilizes heat energy from a pre-existing heat source, such as a kitchen stove, to increase the temperature of a moving stream of air in order to provide a means for warming the interior of a house, trailer or the like.

Devices are known to the prior art that incorporate a space heater within a cooking stove in order to provide a moving stream of warm air into a closed living area, but it has been found that these devices are generally inefficient and uneconomical. The prior art devices are generally characterized by a separate non-cooking heating element, a fan and conduit means taking in cool air and expelling warm air. One mode of warming the moving stream of air known to the prior art is to provide a non-cooking heating element positioned in the path thereof with another mode being the utilization of exhaust gases from a gas burner to warm the exterior of tubular conduits against which the moving stream may impinge and be warmed.

The stove of the instant invention may be used for emergency or auxiliary heating in regions of severe winters or may be used in lieu of a more complicated and expensive heating system in an area of mild winters. The instant invention has a particularly advantageous use in mobile homes located in areas of mild climates since it is necessary only to remove the chill within the living area, even during the coldest months.

An object of the instant invention is to provide a space heater for use in conjunction with a heat source, such as a kitchen stove or the like, which utilizes to a maximum degree the heat produced by the source.

Another object of the instant invention is to provide a space heater integrally formed with a cooking stove of the electric, gas or butane type.

A further object of the instant invention is to provide a blower or fan in conjunction with a space heater of the type described for forcibly delivering a stream of warm air into an enclosed living area.

A still further object of the instant invention is to provide a space heater having at least one conduit coextensive with an oven wall to facilitate the heating of a moving stream of air.

A more specific object of the instant invention is to provide a space heater having a large conduit positioned between the broiler area and oven area of a kitchen stove facilitating the warming of a moving stream of air therein.

A still further more specific object of the instant invention is to provide a warm air delivery outlet for delivering a rapidly moving stream of warm air and, alternatively, a separate outlet for delivering a slower moving stream of air moving as the result of convection currents only.

Other objects and advantages of the instant invention reside in the combinations of elements, arrangements of parts and features of construction and operation, all as will be more fully pointed out hereinafter and disclosed in the accompanying drawings wherein there is shown a preferred embodiment of this inventive concept.

Figure 1:
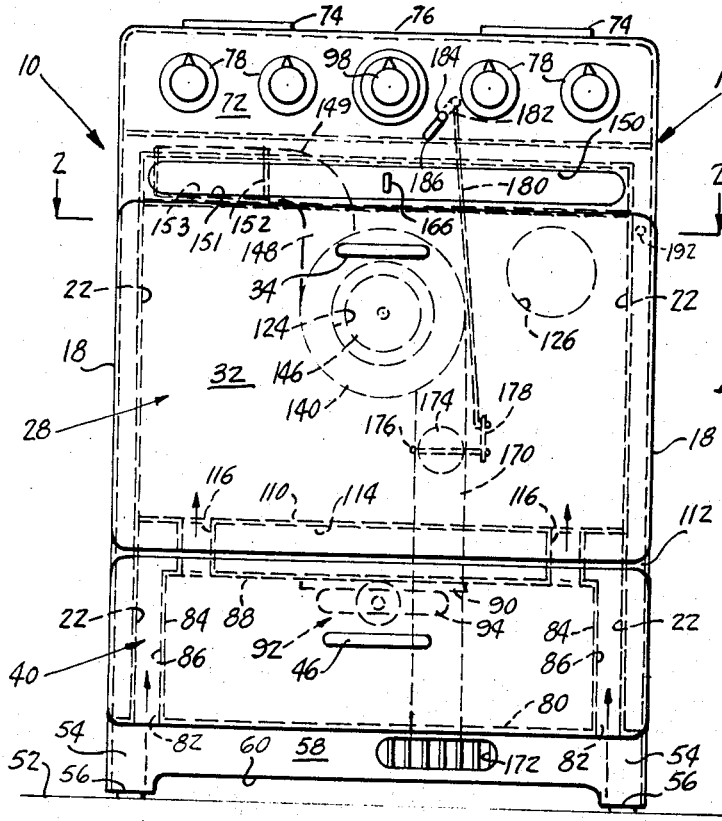
FIGURE 1 is a front elevational view of the cooking stove of the instant invention illustrating in dashed arrow lines the movement of cool air into the stove and the movement of combustion products from a heat source into an oven area.

Referring now to the drawings in detail, wherein like reference characters designate like elements throughout the several views thereof, there is indicated generally at 10 a combination cooking and heating stove including a frame shown generally at 12 housing an oven designated generally at 14 overlying a broiler denominated generally at 16. Frame 12 includes a pair of outer parallel side walls 18 secured to a perpendicular outer rear wall 20 to form an outer housing spaced from an inner housing formed of a pair of parallel inner side walls 22 and a perpendicular inner rear wall 24. Insulation 26 is positioned between the aforementioned inner and outer housings in a known manner to retain thermal energy within stove 10.

Figure 2:
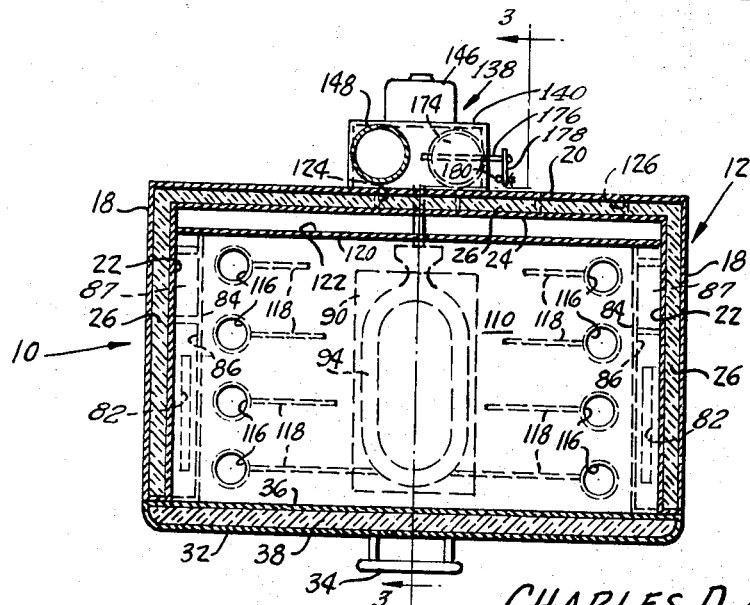
FIGURE 2 is a horizontal cross-sectional view of the stove of FIGURE 1 taken along line 2—2 thereof viewing in the direction of the arrows.
Figure 3:
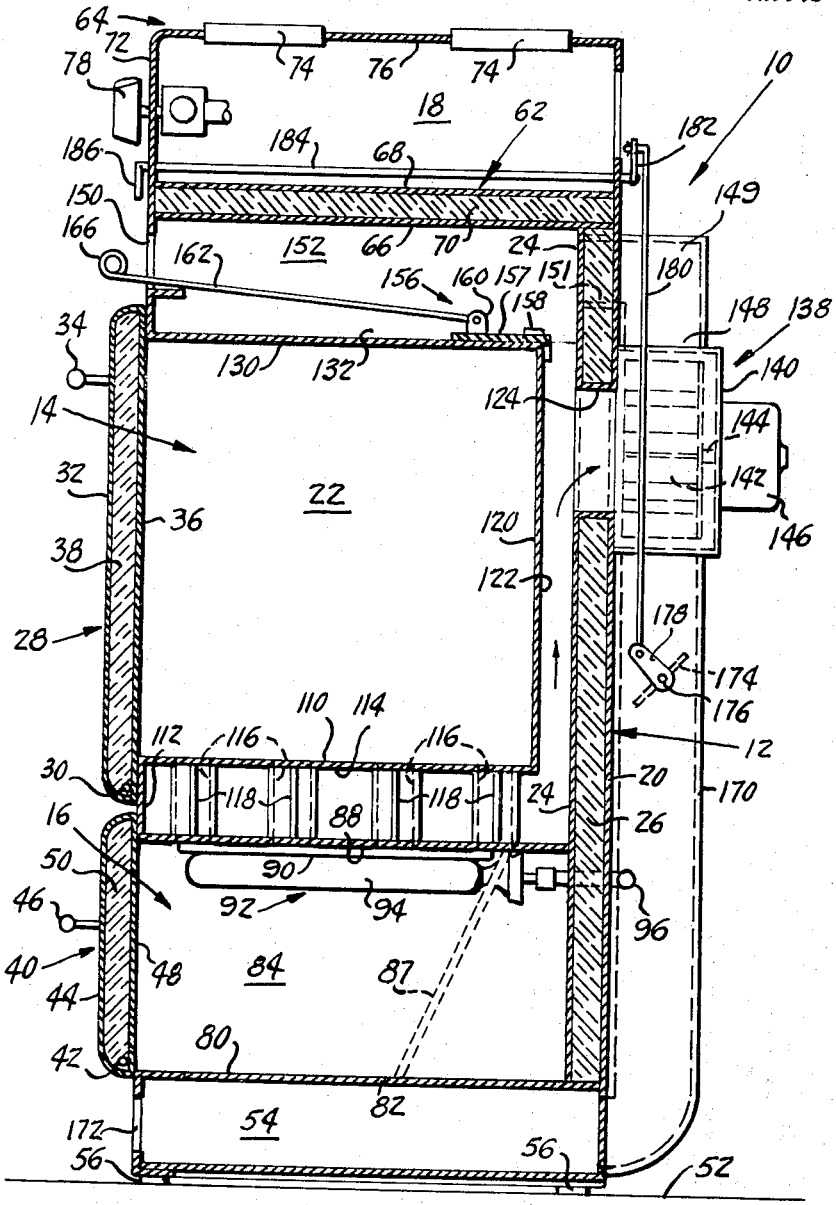
FIGURE 3 is a representative vertical cross-sectional view of the stove of FIGURE 1, FIGURE 3 being taken substantially on the line 3—3 of FIGURE 2, looking in the direction of the arrows.

Stove 10 includes an oven door shown generally at 28 pivoted by a horizontal hinge 30 from a first position shown in FIGURES 1 to 3 inclusive closing oven 14 to a second position providing access thereto. Door 28 includes an outer wall 32 carrying a suitable handle 34, an inner wall 36 and insulating material 38 positioned between walls 32, 36.

A broiler door shown generally at 40 is pivotally mounted on frame 12 by a horizontal broiler hinge 42 with door 40 being pivotable from a first position closing broiler 16, as may be seen in FIGURE 3, to a second position providing access thereto. Broiler door 40 includes an outer wall 44 mounting a convenient handle 46, an inner wall 48 with insulating material 50 being placed between walls 44, 48 in a conventional manner.

Frame 12 is supported from an underlying surface 52 by a pair of depending supporting legs 54 carrying resilient ground supporting knobs 56. A frontal facing 58 is secured to supports 54 on the front side of frame 12 to provide a neat appearance for stove 10 and providing a lower edge 60 spaced from underlying surface 52 providing a passageway such that cool air may enter between lower edge 60 and underlying surface 52 to be drawn within stove 10 as more fully explained hereinafter.

Stove 10 also includes an upper insulating wall shown generally at 62 separating a surface cooking area designated generally at 64 from oven 14 and broiler 16. Upper insulating wall 62 includes a lower horizontal wall 66 and an upper horizontal wall 68 with insulating material 70 being placed therein. As may be seen from FIGURE 3, insulating wall 62 is secured to rear walls 20, 24 and carries an upper front facing 72. A plurality of surface burners 74 are mounted within a top wall 76 with a plurality of controls 78 being provided to actuate and control burners 74. It should be apparent that burners 74 may be of any suitable type, such as electric, gas or butane and are of a conventional type. As may be seen in FIGURE 1, the outer side walls of surface cooking area 64 are bounded by extensions of outer side walls 18 of frame 12.

Broiler 16 is formed by a bottom wall 80 positioned away from underlying surface 52 spanning the peripheral limits of frame 12 and providing a pair of rearwardly extending rectangular cool air inlets 82. Broiler 16 includes side walls 84 spaced from inner side walls 22 of frame 12 forming a pair of cool air conduits 86 in heat-exchanging relation with broiler 16. Cool air conduits 86 are completed by side walls 84 and a rearwardly and upwardly inclined partition wall 87 for purposes more fully explained hereinafter. Closing the upper surface of broiler 16 is a top wall 88 carrying a heat transmitting plate 90, which is illustrated in FIGURE 2 as being of a rather small dimension, but which may be of any convenient size, to which is closely positioned a heat source shown generally at 92.

Heat source 92 includes a heating element 94 which may be of any convenient type, such as electrical, gas, oil or butane, having an input connection 96 in communication with a suitable energy input source (not shown) and actuated by a control knob 98 on front facing 72 as may be seen in FIGURE 1. The rear of broiler 16 is closed by a downwardly extending portion of wall 24 as may be seen in FIGURE 3.

Oven 14 includes a bottom wall 110 positioned parallel to and spaced from broiler top wall 88 by a flange 112 which also acts as one wall of a heated air passageway 114 formed by oven bottom wall 110 and broiler top wall 88. Passageway 114 is in fluid communication with cool air conduits 86 as may be seen in FIGURE 1 with a plurality of conduits 116 extending through passageway 114 providing communication from broiler 16 to oven 14 in order to allow for the escape of combustion products of heating element 94 in a conventional manner. It will be apparent that the majority of incoming air flowing through cool air conduits 86 will be directed by diagonal partition wall 87 toward the front of heated air passageway 114 to promote the efficient heating thereof.

It will be seen that air flowing through passageway 114 is in heat-exchanging relation with respect to broiler top wall 88, oven bottom wall 110, and vertical conduits 116. A plurality of vertical baffles 118 are positioned transversely in passageway 114 and, as may be seen in FIGURE 2, are of greater extent toward the front of stove 10. It will be seen that baffles 118 will be heated through contact with broiler top wall 88 and consequently aid in the heating of air flowing through passageway 114 as well as directing the flowing air toward the center of passageway 114 overlying heating element 94.

Oven 14 includes a back wall 120 spaced from inner rear wall 24 of frame 12 to provide a warm air conduit 122 communicating with a warm air outlet 124 leading through inner and outer rear walls 24, 20. Rear wall 120 forms a flue opening 126 providing communication from within oven 14 to the exterior of stove 12 which may be attached to a venting system in a known manner. An oven top wall 130 is fixedly secured to oven rear wall 120 and the front of frame 12 downwardly from upper insulating wall 62 forming an alternate warm air conduit 132 as more fully explained hereinafter.

Connected to frame outer wall 20 in fluid communication with warm air conduit 122 through warm air outlet 124 is a blower means shown generally at 138 including a housing 140 mounted on rear wall 20. Housing 140 incloses a fan 142 drivingly connected by a rotating shaft 144 to an electric motor 146 mounted on the rear of cylindrical housing 140. Fan 142 delivers a stream of warm air through a discharge conduit which is connected to a duct 170 rearwardly of stove 10 which makes a right angle turn adjacent underlying surface 52 passing underneath broiler 16 to exit an outlet 172 as may be seen in FIGURES 1 and 3, in the front of stove 10.

A butterfly valve 174 is rotatably mounted interiorly of duct 170 by a pivot pin 176. Pin 176 extends outwardly of duct 170 and is fixedly connected to a crank arm 178 which is in turn pivotally connected to a vertical motion transmitting link 180. The upper end of motion transmitting link 180 is rotatably mounted in a crank arm 182 fixedly mounted on a control rod 184 fixedly carrying a control handle 186 on the front of stove 10 as may be seen in FIGURES 1 and 3. It will be seen that the rotation of control handle 186 will vertically reciprocate transmission link 180 opening and closing butterfly valve 174 within duct 170.

When it is desired to utilize the heating capabilities of stove 10, it is necessary first to rotate control knob 98 to actuate broiler heating element 94. Blower 138 is then actuated by any suitable control means with butterfly valve 174 positioned in an open position. Air will be induced by blower 138 through cool air inlets 82, as may be seen in FIGURES 1 and 3, and will move substantially vertically through cool air conduits 86 as shown by the arrows in FIGURE 1, with a certain amount of warming occurring because of heat exchange across broiler wall 84. The moving air stream will then flow into passageway 114 where additional warming will occur because of contact with broiler top wall 88, oven bottom wall 100, vertical conduits 116 and vertical baffles 118.

Baffles 118 will direct a substantial amount of the inflowing air centrally of passageway 114 overlying heating element 94. Flowing air will then flow vertically through conduit 122 as may be seen by the arrow in FIGURE 3 and will exit through warm air outlet 124 into blower 138. Blower 138 will forcibly deliver warmed air through duct 170 out of outlet 172 into a room in which stove 10 is positioned.

In order to provide an alternative warm air delivery system, a valve means shown generally at 156 is provided between warm air conduit 122 and alternative warm air conduit 132 and includes a slidable plate 157 carries an upstanding bracket 160 pivotally receiving an elongate actuating rod 162 extending through a slot 150 in the front of stove 10. Actuating rod 162 carries a toroidal handle 166 which may be grasped by an individual to reciprocate plate 157 under bracket 158 to prevent fluid communication between conduits 122, 132.

As is apparent from FIGURE 3, handle 166 may be grasped by an individual and pushed to close conduit 122 to insure the delivery of warm air to blower 138 and duct 170 as previously explained. To take advantage of alternate warm air conduit 132, an individual should grasp handle 166 and pull, thereby reciprocating plate 157 and allowing fluid communication between warm air conduit 122 and alternate conduit 132. With blower 138 off, a slow moving stream of warm air will rise through warm air conduit 122 through alternate warm air conduit 132 out of slot 150 into an enclosed living area.

In order to provide another warm air delivery system, blower 138 is preferably equipped with a substantially vertical discharge conduit 148 interiorly of which may be positioned a butterfly valve similar to valve 174 and actuated in a similar manner for delivering warm air from blower 138 into a duct 149 communicating through an opening 151 into alternative warm air conduit 132. A vertical wall 152 is positioned in alternative conduit 132 dividing it into two portions which are designated as 150, 153 in FIGURE 1 for purposes of convenience. Conduit portion 153 communicates with opening 151 and is separated from portion 150 by vertical wall 152 and is separated from vertical warm air conduit 122 by a horizontal stationary plate spanning the gap produced thereby at the rear of stove 10. On the other hand, conduit portion 150 is separated from conduit portion 153.

It will be seen that the closing of butterfly valve 174 and the opening of a similar valve in outlet 148 will forcibly deliver a rapidly moving stream of warm air through duct 149 and conduit portion 153 into the interior of an enclosed living area. It is apparent, therefore, that stove 10 provides three separate utilizable warm air delivery systems, one delivering a rapid stream of warm air at the bottom of stove 10, one delivering a rapid stream of moving air adjacent the top of stove 10, and one delivering a relatively slow moving stream of warm air adjacent the upper end of stove 10.

As may be seen in FIGURE 1, a push-to-actuate switch 192 is positioned adjacent the upper end of oven door wall 36 and connected to blower 138 to insure that the oven door is closed when blower 138 operates.

It is now seen that there is herein provided an improved cooking and heating stove having all of the objects of the instant invention and others, including many advantages of great practical utility and commercial importance.

Since many embodiments may be made of the instant inventive concept, and since many modifications may be made of the embodiment hereinbefore shown and described, it is to be understood that the foregoing is to be interpreted merely as illustrative and not in a limiting sense.

I claim:

1. A combination heating and cooking stove comprising a frame housing an oven and a broiler positioned beneath said oven forming a passageway between and in heat exchanging relation with said oven and said broiler, a heat source in said broiler, said frame forming at least one cool air inlet and conduit in communication with said passageway and at least one warm air outlet and conduit providing communication between said passageway and the exterior of said stove.

2. The structure of claim 1 wherein said warm air conduit lies juxtaposed to and in heat exchanging relation with said oven.

3. The structure of claim 1 wherein said cool air conduit lies juxtaposed to and in heat exchanging relation with said broiler.

4. The structure of claim 3 wherein said warm air conduit lies juxtaposed to and in heat exchanging relation with said oven.

5. The structure of claim 4 including a blower means in communication with said warm air outlet for forcibly expelling a stream of warm air from said stove.

6. The structure of claim 5 wherein said frame forms a front wall, said blower means being positioned on said frame other than on said front wall, and an alternate warm air outlet on front of said frame in communication with said warm air conduit through an alternate warm air conduit including means for selectively opening and closing said alternate warm air conduit.

7. The structure of claim 6 including an additional warm air outlet on said front of said frame in communication with said blower means through an additional warm air conduit, said additional warm air outlet and conduit being separated from said alternate warm air conduit.

8. A combination cooking and heating stove comprising a frame housing a broiler including depending side walls and a substantially horizontal top wall carrying a heat source and an oven including a substantially horizontal bottom wall spaced from said broiler top wall forming a heated air passageway, said frame providing side walls adjacent said broiler side walls forming cool air conduits communicating with said heated air passageway, said frame providing a rear wall adjacent said oven rear wall forming a warm air conduit communicating with said heated air passageway, said frame forming at least one cool air inlet communicating with said cool air conduits and at least one warm air outlet communicating with said warm air conduit.

9. The structure of claim 8 wherein a plurality of conduits connect said broiler and said oven providing an escape for combustion gases from within said broiler, said conduits traversing said heated air passageway, and at least one flue conduit connecting said oven in the exterior of said frame housing forming a flue.

10. The structure of claim 8 including blower means in communication with siad warm air conduit for forcibly delivering warm air exteriorly of said stove.

11. The structure of claim 10 wherein said frame forms an alternate warm air conduit communicating with said warm air conduit in parallel with said blower means and including an alternate warm air outlet for convectionally delivering a stream of warm air to the exterior of said stove.

12. The structure of claim 11 wherein said frame forms an additional warm air conduit communicating with said blower means for forcibly delivering a stream of warm air to the exterior of said stove.

13. The structure of claim 12 wherein said additional warm air conduit exits from said frame at a location vertically spaced from said warm air outlet.

14. The structure of claim 1 including a blower means in communication with said warm air outlet for forcibly expelling a stream of warm air from said stove.

References Cited

UNITED STATES PATENTS

| 33,050 | 8/1861 | Pond | 126—6 |
| 1,657,136 | 1/1928 | Reedy | 126—139 |
| 2,220,637 | 11/1940 | Boboian | 126—6 |
| 2,222,436 | 11/1940 | Leonard | 126—4 |

FREDERICK KETTERER, *Primary Examiner.*

UNITED STATES PATENT OFFICE
CERTIFICATE OF CORRECTION

Patent No. 3,358,671                          December 19, 1967

Charles D. Osborne

It is certified that error appears in the above identified patent and that said Letters Patent are hereby corrected as shown below:

In the drawing, Figure 1 has been corrected to show opening 126, as horizontal flue duct 126, in dashed lines, in a functional fit means.

Line 2-2 of Figure 1, has been corrected to a lower position, to intersect horizontal flue duct 126, in a functional fit means.

Figure 2 has been corrected, in a fit means, in keeping with the new position of line 2-2, on Figure 1, in a functional fit means. Figure 2 has further been corrected, in the showing at horizontal flue duct 126, in a fit means, in keeping with same, as described in column 3, lines 55-61, in a functional fit means.

Signed and sealed this 24th day of March 1970.

(SEAL)
Attest:

EDWARD M. FLETCHER, JR.               WILLIAM E. SCHUYLER, JR.
Attesting Officer                        Commissioner of Patents